United States Patent [19]

Bardoliwalla

[11] Patent Number: 4,699,225
[45] Date of Patent: Oct. 13, 1987

[54] DRILLING FLUIDS CONTAINING AMPS, ACRYLIC ACID, ITACONIC ACID POLYMER

[75] Inventor: Dinshaw F. Bardoliwalla, Randolph, N.J.

[73] Assignee: Diamond Shamrock Chemicals Company

[21] Appl. No.: 795,883

[22] Filed: Nov. 7, 1985

Related U.S. Application Data

[62] Division of Ser. No. 608,864, May 10, 1984, Pat. No. 4,622,373.

[51] Int. Cl.$^4$ ............................ C09K 7/02; E21B 7/18
[52] U.S. Cl. .................................... 175/72; 252/8.514
[58] Field of Search ........................ 175/72; 166/275; 252/8.514

[56] References Cited

U.S. PATENT DOCUMENTS

| | | |
|---|---|---|
| 2,718,497 | 9/1955 | Oldham et al. . |
| 3,547,899 | 12/1970 | Arit et al. . |
| 3,806,367 | 4/1974 | Lange et al. . |
| 3,898,037 | 8/1975 | Lange et al. . |
| 3,928,196 | 12/1975 | Persinski et al. . |
| 4,015,991 | 4/1977 | Persinski et al. . |
| 4,293,427 | 10/1981 | Lucas et al. . |
| 4,309,523 | 1/1982 | Engelhardt et al. . |
| 4,432,879 | 2/1984 | Greaves et al. . |
| 4,525,562 | 6/1985 | Patel ................................. 526/271 |

Primary Examiner—Christopher Henderson
Attorney, Agent, or Firm—Neal T. Levin

[57] ABSTRACT

Polymers of (1) from about 5% to about 50% by weight of 2-acrylamido-2-methylpropane sulfonic acid and (2) from about 95% to about 50% by weight of a second component, there being from 100% to about 80% by weight acrylic acid and from 0% to about 20% by weight of itaconic acid in the second component and having a weight average molecular weight of between about 50,000 to about 1,000,000 and which are at least water dispersible are used as fluid loss control additives for aqueous drilling fluids and are particularly advantageous when used with muds containing soluble calcium ions and muds containing chloride ions such as seawater muds. An example is a copolymer of 10% by weight 2-acrylamido-2-methylpropane sulfonic acid and 90% by weight acrylic acid in its sodium salt form.

26 Claims, No Drawings

DRILLING FLUIDS CONTAINING AMPS, ACRYLIC ACID, ITACONIC ACID POLYMER

This is a division, of application Ser. No. 608,864, filed May 10, 1984 U.S. Pat. No. 4,622,373.

BACKGROUND OF THE INVENTION

1. Field of the Invention

This invention relates to particular copolymers and terpolymers prepared in part from the monomer 2-acrylamido-2-methylpropane sulfonic acid (AMPS) which are at least water dispersible and their use as fluid loss control additives for aqueous drilling fluids which are used in drilling wells in subterranean formations.

2. Description of the Prior Art

Rotary systems are generally used in drilling oil and gas wells. These systems depend upon rotation of a string of drill pipe to the bottom of which is attached a drill bit. The bit cuts into the formation causing the cuttings to accumulate as drilling continues. A drilling fluid is used which lubricates the drill bit and carries cuttings to the surface for removal. This allows the bit to continue functioning and the bottom hole to be clean and free of cuttings. The drilling fluid is also the source of pressure which is exerted against the formation. Even in other drilling systems, drilling fluids are still needed to remove bore hole cuttings and to otherwise perform functions related to drilling fluids.

Oil and gas producing formations are generally porous layers having varying degrees of permeability to the flow of fluids such as oil, water or gas. When drilling throgh such porous formations, it is essential to employ drilling fluids having characteristics such that excessive amounts of the drilling fluid do not penetrate the porous formation. Drilling fluids have a tendency to penetrate the formation because the pressure in the bore hole is greater than the pressure opposing it which comes from the formation. Should excess penetration occur, there is loss of drilling fluid into the formation resulting in loss of pressure, inability to drill and remove cuttings and in the case of loss from brine muds, extra expense because of their cost. Mere filter cake formation on the wall of the bore hole does not adequately eliminate fluid loss.

Various materials have been added to drilling fluids to control fluid loss and have included materials such as pregelatinized starch, sodium carboxymethyl cellulose, sodium polyacrylates and lignites.

U.S. Pat. No. 2,718,497—Oldham et al, Sept. 20, 1955, disclose that polymers of acrylic acid when added to drilling muds reduce fluid loss of same. The muds to which the polymer is added is added do not contain significant quantities of soluble calcium or chloride ions.

U.S. Pat. No. 4,293,427—Lucas et al, Oct. 6, 1981 describe copolymers of (1) a (meth)acrylamido alkyl sulfonic acid, including AMPS, and (2) a (meth)acrylamide or N-alkyl (meth)acrylamide or cross-linked copolymer thereof as filtration control agents for drilling fluids in subterranean formations. Other filtration control agents for drilling fluids are referred to as well.

U.S. Pat. No. 4,309,523—Engelhardt et al, Jan. 5, 1982 disclose drilling mud additives which are polymers of AMPS and N-vinylamides. Water loss properties are measured.

U.S. Pat. No. 3,547,899—Arit et al, Dec. 15, 1970 disclose homopolymers and copolymers of AMPS. Acrylic acid is disclosed as a comonomer. The polymers may be used to prepare films and fibers.

U.S. Pat. No. 3,806,367—Lange et al, Apr. 23, 1974 and U.S. Pat. No. 3,898,037—Lange et al, Aug. 5, 1975 disclose copolymers and terpolymers of AMPS in molecular weight ranges of 750 to 5,000,000, the preferable range being from about 750 to 250,000. Comonomers are vinyl monomers with acrylic acid and itaconic acid enumerated among others. These polymers are used as dispersants for particles in aqueous systems.

U.S. Pat. No. 3,928,196—Persinski et al, Dec. 23, 1975 disclose a method of inhibiting scale formation using copolymers containing about from 5 to 75 mole % of AMPS and from about 95 to 25 mole % of acrylic acid having molecular weights of from about 1,000 to 100,000.

U.S. Pat. No. 4,015,991—Persinski et al, Apr. 5, 1977 disclose copolymers of AMPS and acrylamide hydrolyzed to the extent of at least 20% as fluid loss additives for cement.

U.S. Pat. No. 4,432,879—Greaves et al, Feb. 21, 1984, disclose deposition prevention agents for cooling water systems which are combinations of (1) particular phosphonates and (2) water soluble copolymers. The copolymers are vinyl addition type copolymers where a copolymer of methacrylic acid and AMPS in a 1:1 mole ratio and 5,000 molecular weight is preferred. Acrylic acid is enumerated among other ethylenically unsaturated acids and anhydrides. Mole proportions of the monomers is generally from 5:95 to 95:5, preferably 50:50 and molecular weight ranges from 500 to 750,000, in particular from 1,000 to 10,000 and especially from 4,000 to 6,000.

Where polyacrylates are added to fresh water muds, fluid loss can be reasonably controlled. However, where soluble calcium or chloride ions are present in the muds, generally in excess of about 300 ppm of soluble calcium ions and in excess of about 1,000 ppm of chloride ions, as for example from the cement or from the formation in the case of the former and from seawater (brine) and salt water in the case of the latter, particularly under conditions of high temperaure and pressure, polyacrylates are not as effective in controlling fluid loss.

SUMMARY OF THE INVENTION

Particular copolymers and terpolymers of 2-acrylamido-2-methylpropane sulfonic acid which are at least water dispersible have been found to be outstanding fluid loss control additives, not only for fresh water muds, but also for muds having high soluble calcium and chloride concentrations, especially under conditions of high temperature and pressure. The polymers are copolymers of 2-acrylamido-2-methylpropane sulfonic acid and acrylic acid and terpolymers of 2-acrylamido-2-methyl-propane sulfonic acid, acrylic acid and itaconic acid.

These polymers are added to water based drilling fluids, usually muds, which are then used in the conventional manner. Drilling fluids, particularly muds containing soluble calcium ions in excess of about 300 ppm and muds containing chloride ions in excess of about 1,000 ppm, which contain these polymers are characterized by outstanding fluid loss properties when employed under conditions of high temperature and pressure, such as in excess of 300° F. and 500 psi. Thus, these copolymers are not only as effective as polyacrylate homopolymers when used as fluid loss additives with fresh water muds, but are far superior than polyacrylate homopolymers when used as fluid loss additives for high calcium and high chloride muds under conditions of high temperature and pressure.

DESCRIPTION OF THE PREFERRED EMBODIMENTS

The Polymers

The polymers are polymers of (1) from about 5% to about 50% by weight of 2-acrylamido-2-methylpropane sulfonic acid and (2) from about 95% to about 50% by weight of a second component, there being from 100% to about 80% by weight acrylic acid and from 0% to about 20% by weight of itaconic acid (ITA) in the second component. The polymers are at least water dispersible, i.e., water dispersible or water soluble. In its terpolymer form the range of the three components are from about 5 to about 50% by weight 2-acrylamido-2-methylpropane sulfonic acid, from about 50% to about 80% by weight acrylic acid and from about 3% to about 15% by weight itaconic acid. The polymers have a weight average molecular weight of between about 50,000 to 1,000,000, preferably between about 100,000 to about 500,000. They can be used in free acid form or in the form of any partially or completely neutralized inorganic, organic amine or quaternary ammonium salt so long as they are at least water dispersible. Examples are the sodium, potassium, ammonium, mono, di and tri $C_1$-$C_4$ alkyl amine and mono, di and tri $C_2$-$C_4$ alkanolamine salts. They can also contain mixed sodium, potassium, ammonium, organic amine or quaternary ammonium cations in their partially or completely neutralized form. Also, the cation in the polymer may be dependent upon the pH of the mud. For example, if the polymer is introduced into the mud in its free acid form, as a result of the alkalinity of the mud, it may actually be present in the mud in the form of its partially or completely neutralized salt form.

One or more of these polymers are present in the various drilling fluids including muds containing soluble calcium ions and muds containing chloride ions in amount sufficient to reduce fluid loss of the drilling fluid, for example, in amounts of from about 0.5 to about 10 pounds, preferably from about 2 to about 6 pounds per 42 gallon barrel of drilling fluid.

The polymers can be prepared from their respective monomers by conventional polymerization procedures, viz., solution, emulsion or bulk polymerization in the presence of conventional free radical initiators. Such procedures are well documented in the literature and do not form a part of this invention.

Examples of copolymers are (percents are weight percents):
sodium salt of the copolymer of acrylic acid (90%) and AMPS (10%)
potassium salt of the copolymer of acrylic acid (80%) and AMPS (20%)
free acid of the copolymer of acrylic acid (60%) and AMPS (40%)
monomethyl ammonium salt of the copolymer of acrylic acid (75%) and AMPS (25%)
monoethanolamine salt of the copolymer of acrylic acid (70%) and AMPS (30%)
trimethyl ammonium salt of the copolymer of acrylic acid (50%) and AMPS (50%)
ammonium salt of the copolymer of acrylic acid (70%) and AMPS (30%)

Examples of terpolymers are (percents are weight percents):
sodium salt of the terpolymer of acrylic acid (76%), AMPS (19%) and itaconic acid (5%)
potassium salt of the terpolymer of acrylic acid (57%), AMPS (38%) and itaconic acid (5%)
free acid of the terpolymer of acrylic acid (72%), AMPS (18%) and itaconic acid (10%)
diethanolamine salt of the terpolymer of acrylic acid (76%), AMPS (19%) and itaconic acid (5%)
trimethyl ammonium salt of the terpolymer of acrylic acid (54%), AMPS (36%) and itaconic acid (10%)
terpolymer of the monoethanolamine salt of acrylic acid (54%), sodium salt of AMPS (36%) and the ammonium salt of itaconic acid (10%)

Optionally, the dry polymer in free acid form can be admixed with carbonate, e.g., sodium carbonate (soda ash), in amounts up to about 30% by weight in order to bring about complete neutralization of the polymer and eliminate subsequent pH adjustment of the mud containing same. The polymers can be added to the drilling fluid formulations in dry, solution or emulsion form.

Drilling Fluids

The polymers can be used with a wide variety of water based drilling fluids such as clear drilling fluids, low solids muds, bentonite and weighted muds. Muds can be classified as fresh water, soluble calcium ion and chloride ion containing muds. The soluble calcium ion is from the cement or the formation and the chloride ion from seawater (brine) and salt water. The latter two generally have present soluble calcium ions in excess of about 300 ppm and chloride ions in excess of about 1,000 ppm, respectively. These drilling fluids, including the muds and their preparation, are well known in the drilling art. For purposes of evaluation, the following procedures were used to prepare muds having the compositions set forth in Table I.

Fresh water mud was prepared by slowly adding a clayey material, bentonite, with high shear mixing, e.g., using a Premier Series 2000 Dispersator from Premier Mill Corp., to distilled water followed by mixing for one hour. Thereafter, the resulting bentonite slurry is allowed to hydrate for 48 to 72 hours.

Calcium mud and seawater mud I were prepared by adding the required amount of calcium chloride or sodium chloride plus sea salt to bentonite as prepared above followed by stirring for 30 to 45 minutes.

Thinner base mud was prepared by adding sodium chloride and calcium carbonate to distilled water while mixing. Thereafter, the following clay materials were added slowly in the following order: rev dust, Wyoming bentonite and calcium bentonite. Each clay was then mixed for 10 minutes at medium speed with a Premier Series 2000 Dispersator before adding the next clay. After adding the last clay, the mix was stirred for 30 minutes at medium speed and then aged overnight at room temperature.

Seawater mud II was prepared by adding sea salt to thinner base mud and then stirring the mixture for 45 minutes.

In the case of all muds, before obtaining a sample from stock for polymers evaluation, the mud is stirred for 2 to 3 minutes to ensure homogeneity and pH of the mud is adjusted individually to pH 10 before adding the polymer.

The mud compositions appear below.

TABLE

MUD COMPOSITIONS

| Ingredients | Fresh Water Mud (% by wt.) | Seawater Mud I (% by wt.) | Thinner Base Mud (% by wt.) | Seawater Mud II (% by wt.) | 2000 PPM Ca++ Mud (% by wt.) |
|---|---|---|---|---|---|
| Water | 93.96 | 78.81 | 85.65 | 82.77 | 93.27 |
| Wyoming bentonite | 6.04 | 2.29 | 6.12 | 5.91 | 6.00 |
| OCMA clay* | — | — | 16.02 | — | — |
| NaCl | — | 1.60 | 0.21 | 0.21 | — |
| Salt | — | — | 2.88 | — | 3.59 | — |
| Sea salt | — | 1.28 | — | 3.38 | — |
| Calcium bentonite | — | — | 5.14 | 4.96 | — |
| REV dust** | — | — | 2.45 | 2.36 | — |
| Calcium carbonate | — | — | 0.43 | 0.41 | — |
| CaCl$_2$.2H$_2$O | — | — | — | — | 0.73 |
| Total | 100.00 | 100.00 | 100.00 | 100.00 | 100.00 |
| pH | 10.00 | 10.40 | 10.00 | 10.00 | 10.00 |

*Mixture of kaolin and china clay
**Drilling solids which is a mixture of barite and clay

Evaluation of Polymers as Fluid Loss Additives

The following procedures were utilized to evaluate the polymers as fluid loss additives in the various drilling muds.

Preparation of Test Samples (Polymer Plus Mud)

350 ml of mud is placed in a stainless steel beaker. The required amount of polymer is weighed in a weighing dish (1 gm. polymer in 350 ml mud equals 1 pound per barrel). With thorough mixing, the polymer is added slowly to the mud and mixed for an additional 15-20 minutes. The pH of the mud is monitored during mixing and adjusted to pH 10, if necessary. After the mixing period, viscosities and gel strength of the mud can be measured if desired using a Fann viscometer (Model 35-A). Fluid loss measurements are then run on the samples.

API Fluid Loss Test

Equipment: IMCO Standard Filter Press #R1100 (supplied by Imco Services Div. of Halliburton Company). Nitrogen gas cylinder for pressurizing the fluid loss cell.
Test Conditions: 77° F., 100 psi pressure. Collect filtrate for 30 minutes.
Procedure:
1. The mud sample is placed in the cell of the filter press, the cell filled to within ¼" of the top.
2. The cell is placed in the filter press frame.
3. 100 psi pressure (using nitrogen gas) is applied to the filter cell and timing of the test is started.
4. At the end of 30 minutes, the volume of filtrate collected is read. The lower the volume of filtrate collected, the more effective is the polymer in preventing loss of fluid from the mud formulation.

High Temperature High Pressure Fluid Loss Test

This test method is described in Baroid Drilling Mud Data Book, Section 900, pp. 26-27 entitled, "High Temperature Filtration Testing for Drilling Fluids." The following summarizes the equipment, conditions and procedure.
Equipment: HPHT Filter Press, Model #387 (supplied by NL Baroid, Houston, Tex.), which includes cell and heating jacket.
Test Conditions: Temperature can be varied from 200°-400° F. Pressure is normally set at 500 psi differential (600 psi at top, 100 psi back pressure at bottom).
Procedure:
(a) The mud sample is placed into the fluid loss cell.
(b) The cell is placed into the heating jacket.
(c) Top and bottom pressure lines are connected.
(d) After ensuring that the stems on the fluid loss cell are shut, 250 psi top and 100 psi bottom pressure is applied using nitrogen gas.
(e) The cell is heated to the required temperature (in about one hour's time) and equilibrated at the temperature for an additional half hour.
(f) The bottom stem is opened, then the top stem and any collected fluid is bled out.
(g) Top pressure is set to 600 psi.
(h) Time is recorded and fluid loss readings are taken at intervals of 1, 3, 7½ and 30 minutes.
(i) Total volume of filtrate collected after 30 minutes is recorded and multiplied by two (correction for 3.5 sq. inch filtration area versus 7 sq. inch area).

Heat Aging Test

Equipment: Aging cell, Model #76017 obtained from NL Baroid, Houston, Tex. Roller or forced air oven.
Procedure:
(a) Mud containing polymer is placed in aging cell.
(b) The contents of the cell are pressurized with nitrogen gas using the recommended pressures provided in FIG. 29, page 900-32 of "Mud Volume and Pressure For High Temperature Aging", NL Baroid, Drilling Mud Data Book, Section 900.
(c) The cell is then placed in a roller oven pre-heated to the desired heat aging temperature (dynamic heat aging) or a forced air oven (static heat aging) for 16 hours. All testing is dynamic heat aging unless indicated otherwise.
(d) At the end of the heat aging period, the aging cell is removed from the oven, cooled under cold running water, pressure released and the aged mud transferred into a stainless steel beaker.
(e) The pH of the mud is checked and if necessary adjusted to between 8.5 to 10. Rheology measurements are run using Fann viscometer, Model 35-A followed by the fluid loss test which is either the API or high temperature high pressure fluid loss test described previously.

Mud Rheology

Plastic viscosity (PV), yield point (YP) and gel strengths at 10 second and 10 minute intervals were obtained as described in Applied Mud Technology—7th Edition (1981) pages 3 and 4, published by Imco Services.

For a fuller understanding of the nature and advantages of this invention, reference may be made to the following examples. These examples are given merely to illustrate the invention and are not to be construed in a limiting sense. In the examples, all references to pounds per barrel of drilling fluid are to a 42 gallon barrel of the drilling fluid. Also, ITA refers to itaconic acid.

Molecular Weights

Molecular weights were determined by gel permeation chromatography using polystyrene sulfonic acid as the standard.

EXAMPLE I

Homopolymer of Acrylic Acid

For purposes of comparison with the copolymers of this invention, an additive, viz., a homopolymer of acrylic acid having a weight average molecular weight of about 250,000–300,000, was evaluated as a fluid loss additive in a mud containing 500 ppm calcium ions. Concentration was 2 pounds per barrel. The additive was a mixture of polyacrylic acid (70% by wt.) and soda ash (30% by wt.). Thus, the polymer was partially neutralized. Fluid loss evaluation was conducted at 300° F., 500 psi for 30 minutes without heat aging. Fluid loss was in excess of 120 ml indicating that the homopolymer of acrylic acid is not very effective under these conditions.

EXAMPLE II

Copolymer of Acrylic Acid/AMPS as the Sodium Salt 53.8 parts by weight of a 50% by weight aqueous solution of sodium hydroxide (0.6725 mole) were added with stirring and external cooling to 57.2 parts by weight of deionized water. 39.3 parts by weight (60% by wt.) acrylic acid followed by 26.2 parts by weight (40% by wt.) 2-acrylamido-2-methylpropane sulfonic acid monomer were added to the caustic solution with stirring, maintaining the temperature between 25°–30° C. throughout the neutralization. The pH of the monomer solution was adjusted to 10 with hydrochloric acid.

The monomer solution was transferred into a reactor and polymerized adiabatically using a redox initiator system of 0.53 parts by weight sodium thiosulfate 5H$_2$O, 0.3 parts by weight sodium metabisulfite and 0.3 parts by weight ammonium persulfate. The resulting product, a sodium salt, an extremely high viscosity solution, was cast into a thin film and dried. The polymer in its sodium salt form had a weight average molecular weight of approximately 340,000 and was water soluble.

EXAMPLE III

The dry polymer of Example II was evaluated for its fluid loss efficiency in the calcium and seawater muds of Table I.

Other copolymers prepared in the same manner as the copolymer of Example II were evaluated. The data collected are set forth below in Table I.

TABLE I

Polymer concentration in mud: 2 lbs. per barrel
Test conditions: No heat aging; 30 min. at 300° F., 500 psi

| Copolymer Composition (Na salt) monomer component (wt. %) | | Fluid Loss (ml) | |
|---|---|---|---|
| Acrylic Acid | AMPS | Calcium Mud (500 ppm Ca) | Seawater Mud I |
| Blank | | 176 | 252 |
| 100 | 0 | 114 | — |
| 70 | 30 (Acrylamide)* | 126 | — |
| 90 | 10 | 114 | 100 |
| 80 | 20 | 88 | 80 |
| 70 | 30 | 74 | — |
| 60 | 40 | 54 | 106 |
| 50 | 50 | 50 | — |

*Acrylic copolymer of about 200,000 molecular weight consisting of about 70 mole or wt. % sodium acrylate and about 30 mole or wt. % acrylamide.

The fluid loss for this blank (no fluid loss additive) can be used for comparison throughout. That is, fluid loss for high calcium and high chloride muds exposed to high temperature, high pressure fluid loss conditions for thirty minutes was ≧200 ml.

EXAMPLE IV

Terpolymer of Acrylic Acid/AMPS/Itaconic Acid (76/19/5 wt. % free acid) as the Sodium Salt 180.5 parts by weight of a 36% by weight aqueous solution of sodium acrylate, 27.6 parts by weight of a 50% by weight aqueous solution of sodium AMPS and 8.2 parts by weight of a 53.5% by weight aqueous solution of sodium itaconate were mixed in a reactor and polymerized adiabatically using sodium thiosulfate/sodium metabisulfite/ammonium persulfate catalyst system. The resulting product, a water soluble sodium salt having a weight average molecular weight of 330,000, was dried as in Example II and it and other similarly prepared terpolymers evaluated for its fluid loss efficiency in various types of drilling muds using the previously described procedure. The data are set forth in Tables II and III below.

TABLE II

| Polymer Monomer Component | | | | | Fluid Loss Test Conditions | | | | | Mud Rheology | | | |
|---|---|---|---|---|---|---|---|---|---|---|---|---|---|
| Acrylic Acid (wt %) | AMPS (wt %) | ITA | Dosage* lbs/bbl | Mud | 16 Hr Heat Aging Temp (°F.) | Temp (°F.) | Pr (psi) | Fluid Loss After 30 min (ml) | Filter Cake | PV (cps) | YP | 10 Sec Gel (lbs/100 ft$^2$) | 10 Min Gel |
| 76 | 19 | 5 | 2 | Seawater I | — | 77 | 100 | 23 | — | 33 | 10 | 3 | 7 |
| 76 | 19 | 5 | 2 | Seawater I | 400 | 77 | 100 | 60 | — | 27 | 35 | 19 | 23 |
| 76 | 19 | 5 | 2 | Seawater I | — | 300 | 500 | 44 | — | 21 | 7 | 3 | 4 |
| 76 | 19 | 5 | 2 | Seawater I | 200 | 300 | 500 | 51 | — | 19 | 17 | 7 | 12 |
| 76 | 19 | 5 | 2 | Seawater I | 400 | 300 | 500 | 124 | — | 11 | 28 | 21 | 30 |
| 54 | 36 | 10** | 2 | Seawater I | — | 300 | 500 | 50 | — | 24 | 12 | 2 | 3 |

TABLE II-continued

| Polymer Monomer Component | | | | | Fluid Loss Test Conditions | | | | | Mud Rheology | | | |
|---|---|---|---|---|---|---|---|---|---|---|---|---|---|
| Acrylic Acid (wt %) | AMPS (wt %) | ITA | Dosage* lbs/bbl | Mud | 16 Hr Heat Aging Temp (°F.) | Temp (°F.) | Pr (psi) | Fluid Loss After 30 min (ml) | Filter Cake | PV (cps) | YP | 10 Sec Gel (lbs/100 ft²) | 10 Min Gel |
| 54 | 36 | 10** | 2 | Seawater I | 200 | 300 | 500 | 50 | — | 22 | 25 | 8 | 14 |
| 72 | 18 | 10*** | 2 | Seawater I | — | 300 | 500 | 55 | — | 30 | 12 | 2 | 6 |
| 72 | 18 | 10*** | 2 | Seawater I | 200 | 300 | 500 | 68 | — | 28 | 20 | 8 | 14 |
| 72 | 18 | 10*** | 2 | Seawater I | 400 | 300 | 500 | 124 | — | 11 | 25 | 18 | 32 |

*Polymer present as 70/30% wt. % blend of terpolymer/soda ash which results in a completely neutralized terpolymer (sodium salt form).
**Terpolymer weight average molecular weight is 335,000.
***Terpolymer weight average molecular weight is 330,000.

TABLE III

| Polymer** Monomer Component | | | | | Fluid Loss Test Conditions | | | | | Mud Rheology | | | |
|---|---|---|---|---|---|---|---|---|---|---|---|---|---|
| Acrylic Acid (wt %) | AMPS (wt %) | ITA | Dosage* lbs/bbl | Mud | 16 Hr Heat Aging Temp (°F.) | Temp (°F.) | Pr (psi) | Fluid Loss After 30 min (ml) | Filter Cake | PV (cps) | YP | 10 Sec Gel (lbs/100 ft²) | 10 Min Gel |
| 57 | 38 | 5 | 2 | Seawater I | — | 77 | 100 | 30 | — | 23 | 6 | 1 | 3 |
| 57 | 38 | 5 | 2 | Seawater I | 400 | 77 | 100 | 54 | — | 16 | 36 | 18 | 19 |
| 57 | 38 | 5 | 2 | Seawater I | — | 300 | 500 | 47 | — | 21 | 6 | 1 | 2 |
| 57 | 38 | 5 | 2 | Seawater I | 200 | 300 | 500 | 48 | — | 16 | 18 | 6 | 10 |
| 57 | 38 | 5 | 2 | Seawater I | 400 | 300 | 500 | 126 | — | 11 | 28 | 19 | 32 |
| 57 | 38 | 5 | 5 | Seawater I | — | 300 | 500 | 32 | — | 28 | 9 | 3 | 5 |
| 57 | 38 | 5 | 5 | Seawater I | 200 | 300 | 500 | 30 | — | 24 | 26 | 9 | 17 |
| 57 | 38 | 5 | 5 | Seawater I | 400 | 300 | 500 | 39 | — | 13 | 34 | 21 | 28 |

*Polymer present as 70/30% wt. % blend of terpolymer/soda ash which results in a completely neutralized terpolymer (sodium salt form).
**Terpolymer weight average molecular weight is 340,000.

In the following tables, fluid loss data is presented for muds containing copolymers and terpolymers of AMPS in partially or completely neutralized sodium salt form which have been prepared in the same manner as the copolymers and terpolymers of the preceding examples. In those tables reporting data for the terpolymer of acrylic acid (76%), AMPS (19%) and itaconic acid (5%), the weight average molecular weight of the terpolymer is 370,000.

TABLE IV

| Polymer Monomer Component | | | | Fluid Loss Test Conditions | | | | | Mud Rheology | | | |
|---|---|---|---|---|---|---|---|---|---|---|---|---|
| Acrylic Acid (wt %) | AMPS (wt %) | Dosage* lbs/bbl | Mud | 16 Hr Heat Aging Temp (°F.) | Temp (°F.) | Pr (psi) | Fluid Loss After 30 min (ml) | Filter Cake | PV (cps) | YP | 10 Sec Gel (lbs/100 ft²) | 10 min Gel |
| 70 | 30** | 3 | Fresh water | 150 | 77 | 100 | 5.4 | 2/32" wet, very soft | 63 | 56 | 12 | 23 |
| 70 | 30** | 3 | Fresh water | 300 | 77 | 100 | 7.2 | 2/32" wet, soft | 45 | 38 | 8 | 10 |
| 70 | 30** | 3 | Fresh water | 400 | 77 | 100 | 8.5 | 3/32" wet, soft | 53 | 67 | 13 | 14 |
| 60 | 40 | 2 | Fresh water | — | 300 | 500 | 22 | — | 40 | 39 | 14 | 64 |
| 60 | 40 | 2 | Fresh water | 200 | 300 | 500 | 27 | — | 30 | 16 | 6 | 7 |
| 60 | 40 | 2 | Fresh water | 400 | 300 | 500 | 30 | — | 19 | 11 | 3 | 4 |

*Polymer present as 70/30 wt. % blend of copolymer/soda ash which results in a completely neutralized copolymer (sodium salt form).
**Copolymer weight average molecular weight is 320,000

TABLE V

Seawater Mud II

| Polymer Monomer Component | | | | Fluid Loss Test Conditions | | | | | Mud Rheology | | | |
|---|---|---|---|---|---|---|---|---|---|---|---|---|
| Acrylic Acid (wt %) | AMPS (wt %) | Dosage* lbs/bbl | Mud | 16 Hr Heat Aging Temp (°F.) | Temp (°F.) | Pr (psi) | Fluid Loss After 30 min (ml) | Filter Cake | PV (cps) | YP | 10 Sec Gel (lbs/100 ft²) | 10 Min Gel |
| 70 | 30 | 3 | | 150 | 77 | 100 | 27 | 2/16" uniform | 11 | 5 | 2 | 10 |
| 70 | 30 | 3 | | 300 | 77 | 100 | 63 | 7/16" uniform | 9 | 5 | 8 | 24 |
| 70 | 30 | 3 | | 400 | 77 | 100 | 35 | 3/16" uniform | 8 | 5 | 2 | 8 |
| 60 | 40 | 3 | | — | 300 | 500 | 51 | 5/16" uniform | 16 | 1 | 2 | 3 |
| 60 | 40 | 3 | | 350** | 300 | 500 | 48 | 3/16" uniform | 8 | 8 | 4 | 11 |
| 60 | 40 | 5 | | — | 200 | 500 | 22 | 1/16" uniform | 33 | 5 | 2 | 6 |

TABLE V-continued

Seawater Mud II

| Polymer Monomer Component | | | Fluid Loss Test Conditions | | | | | Mud Rheology | | | |
|---|---|---|---|---|---|---|---|---|---|---|---|
| Acrylic Acid (wt %) | AMPS (wt %) | Dosage* lbs/bbl | 16 Hr Heat Aging Temp (°F.) | Temp (°F.) | Pr (psi) | Fluid Loss After 30 min (ml) | Filter Cake | PV (cps) | YP | 10 Sec Gel (lbs/100 ft²) | 10 Min Gel |
| 60 | 40 | 5 | 350** | 200 | 500 | 22 | 1/16" uniform | 12 | 7 | 3 | 7 |

*Polymer present as 70/30 wt. % blend of copolymer/soda ash which results in a completely neutralized copolymer (sodium salt form).
**Static heat aged

TABLE VI

| Polymer Monomer Component | | | | Fluid Loss Test Conditions | | | | | Mud Rheology | | | |
|---|---|---|---|---|---|---|---|---|---|---|---|---|
| Acrylic Acid (wt %) | AMPS (wt %) | Dosage* lbs/bbl | Mud | 16 Hr Heat Aging Temp (°F.) | Temp (°F.) | Pr (psi) | Fluid Loss After 30 min (ml) | Filter Cake | PV (cps) | YP | 10 Sec Gel (lbs/100 ft²) | 10 Min Gel |
| 60 | 40 | 2 | 500 ppm Ca | — | 300 | 500 | 48 | — | 13 | 4 | 3 | 9 |
| 60 | 40 | 2 | 1000 ppm Ca | — | 300 | 500 | 56 | — | 28 | 22 | 10 | 25 |
| 60 | 40 | 2 | 1000 ppm Ca | 200 | 300 | 500 | 64 | — | 17 | 3 | 3 | 4 |
| 70 | 30 | 3 | 2000 ppm Ca | 150 | 77 | 500 | 10 | 1/16" uniform | 11 | 3 | 2 | 4 |
| 70 | 30 | 3 | 2000 ppm Ca | 300 | 77 | 500 | 11 | 2/16" uniform | 18 | 6 | 2 | 6 |
| 70 | 30 | 3 | 2000 ppm Ca | 400 | 77 | 500 | 22 | 2/16" uniform | 19 | 5 | 3 | 4 |
| 70 | 30 | 3 | 2000 ppm Ca | 400 | 300 | 500 | 56 | 4/16" uniform | 14 | 6 | 2 | 4 |
| 60 | 40 | 5 | 2000 ppm Ca | — | 200 | 500 | 13 | 1/16" uniform | 65 | 54 | 16 | 88 |
| 60 | 40 | 5 | 2000 ppm Ca | 350** | 200 | 500 | 18 | 1/16" uniform | 28 | 12 | 5 | 7 |
| 60 | 40 | 2 | 3000 ppm Ca | — | 300 | 500 | 100 | — | 15 | 7 | 4 | 13 |

*Polymer present as 70/30 wt. % blend of copolymer/soda ash which results in a completely neutralized copolymer (sodium salt form).
**Static heat aged

TABLE VII

| Polymer Monomer Component | | | | Fluid Loss Test Conditions | | | | | Mud Rheology | | | |
|---|---|---|---|---|---|---|---|---|---|---|---|---|
| Acrylic Acid (wt %) | AMPS (wt %) | Dosage* lbs/bbl | Mud | 16 Hr Heat Aging Temp (°F.) | Temp (°F.) | Pr (psi) | Fluid Loss After 30 min (ml) | Filter Cake | PV (cps) | YP | 10 Sec Gel (lbs/100 ft²) | 10 Min Gel |
| 60 | 40 | 2 | 1000 ppm NaCl | — | 300 | 500 | 50 | — | 30 | 24 | 12 | 37 |
| 60 | 40 | 2 | 1000 ppm NaCl | 200 | 300 | 500 | 48 | — | 21 | 9 | 3 | 4 |
| 60 | 40 | 2 | 34,000 ppm NaCl | — | 300 | 500 | 50 | — | 12 | 13 | 13 | 24 |
| 60 | 40 | 2 | 34,000 ppm NaCl | 200 | 300 | 500 | blow out | — | 12 | 8 | 5 | 11 |
| 60 | 40 | 2 | 1000 ppm (Na)$_2$SO$_4$ | — | 300 | 500 | 46 | — | 26 | 21 | 8 | 24 |
| 60 | 40 | 2 | 1000 ppm (Na)$_2$SO$_4$ | 200 | 300 | 500 | 48 | — | 17 | 9 | 3 | 3 |
| 60 | 40 | 2 | 34,000 ppm (Na)$_2$SO$_4$ | — | 300 | 500 | 52 | — | 17 | 13 | 11 | 30 |
| 60 | 40 | 2 | 34,000 ppm (Na)$_2$SO$_4$ | 200 | 300 | 500 | 56 | — | 12 | 15 | 29 | 48 |

*Polymer present as 70/30% wt. % blend of copolymer/soda ash which results in a completely neutralized copolymer (sodium salt form).

TABLE VIII

| Polymer Monomer Component | | | | Fluid Loss Test Conditions | | | | | Mud Rheology | | | |
|---|---|---|---|---|---|---|---|---|---|---|---|---|
| Acrylic Acid (wt %) | AMPS (wt %) | Dosage* lbs/bbl | Mud | 16 Hr Heat Aging Temp (°F.) | Temp (°F.) | Pr (psi) | Fluid Loss After 30 min (ml) | Filter Cake | PV (cps) | YP | 10 Sec Gel (lbs/100 ft²) | 10 Min Gel |
| Blank | — | — | Seawater I | — | 300 | 500 | 252 | — | 9 | 104 | 30 | 36 |
| 60 | 40 | 2 | Seawater I | — | 300 | 500 | 106 | — | 17 | 5 | 2 | 4 |
| 80 | 20 | 2 | Seawater I | — | 300 | 500 | 80 | — | 22 | 10 | 3 | 5 |
| 90 | 10 | 2 | Seawater I | — | 300 | 500 | 100 | — | 17 | 4 | 2 | 4 |

*Polymer present as 70/30% wt. % blend of copolymer/soda ash.

TABLE IX

| Polymer Monomer Component | | | | | Fluid Loss Test Conditions | | | | | Mud Rheology | | | |
|---|---|---|---|---|---|---|---|---|---|---|---|---|---|
| Acrylic Acid (wt %) | AMPS (wt %) | ITA | Dosage* lbs/bbl | Mud | 16 Hr Heat Aging Temp (°F.) | Temp (°F.) | Pr (psi) | Fluid Loss After 30 min (ml) | Filter Cake | PV (cps) | YP | 10 Sec Gel (lbs/100 ft²) | 10 Min Gel |
| 76 | 19 | 5 | 3 | Fresh water | 150 | 77 | 100 | 5.2 | 3/32" soft, wet | 61 | 55 | 12 | 19 |
| 76 | 19 | 5 | 3 | Fresh water | 300 | 77 | 100 | 6.4 | 2/32" soft, wet | 50 | 47 | 10 | 11 |
| 76 | 19 | 5 | .3 | Fresh water | 400 | 77 | 100 | 7.1 | 2/32" soft, wet | 47 | 52 | 10 | 10 |

*Polymer present as 70/30% wt. % blend of terpolymer/soda ash which results in a completely neutralized terpolymer (sodium salt form).

TABLE X

Seawater Mud II

| Polymer Monomer Component | | | | Fluid Loss Test Conditions | | | | | Mud Rheology | | | |
|---|---|---|---|---|---|---|---|---|---|---|---|---|
| Acrylic Acid (wt %) | AMPS (wt %) | ITA | Dosage* lbs/bbl | 16 Hr Heat Aging Temp (°F.) | Temp (°F.) | Pr (psi) | Fluid Loss After 30 min (ml) | Filter Cake | PV (cps) | YP | 10 Sec Gel (lbs/100 ft²) | 10 Min Gel |
| 76 | 19 | 5 | 3 | 150 | 77 | 100 | 30 | 3/16" uniform | 10 | 5 | 3 | 12 |
| 76 | 19 | 5 | 3 | 300 | 77 | 100 | 40 | 4/16" uniform | 9 | 6 | 3 | 12 |
| 76 | 19 | 5 | 3 | 400 | 77 | 100 | 39 | 4/16" uniform | 8 | 9 | 7 | 7 |
| 76 | 19 | 5 | 3 | — | 300 | 500 | 68 | 6/16" uniform | 7 | 3 | 1 | 2 |
| 76 | 19 | 5 | 3 | 350** | 300 | 500 | 66 | 4/16" uniform | 6 | 9 | 3 | 7 |
| 76 | 19 | 5 | 3 | 400 | 300 | 500 | 72 | 2/16" uniform | 8 | 9 | 8 | 22 |
| 76 | 19 | 5 | 5 | — | 200 | 500 | 16 | 1/16" uniform | 47 | 37 | 7 | 8 |
| 76 | 19 | 5 | 5 | 350** | 200 | 500 | 18 | 1/16" uniform | 13 | 7 | 3 | 7 |

*Polymer present as 70/30% wt. % blend of terpolymer/soda ash which results in a completely neutralized terpolymer (sodium salt form).
**Static heat aged

TABLE XI

| Polymer Monomer Component | | | | | Fluid Loss Test Conditions | | | | | Mud Rheology | | | |
|---|---|---|---|---|---|---|---|---|---|---|---|---|---|
| Acrylic Acid (wt %) | AMPS (wt %) | ITA | Dosage* lbs/bbl | Mud | 16 Hr Heat Aging Temp (°F.) | Temp (°F.) | Pr (psi) | Fluid Loss After 30 min (ml) | Filter Cake | PV (cps) | YP | 10 Sec Gel (lbs/100 ft²) | 10 Min Gel |
| 76 | 19 | 5 | 3 | 2000 ppm Ca | 150 | 77 | 100 | 40 | 4/16" uniform | 20 | −6 | 2 | 3 |
| 76 | 19 | 5 | 3 | 2000 ppm Ca | 300 | 77 | 100 | 9 | 1/16" uniform | 19 | 3 | 2 | 2 |
| 76 | 19 | 5 | 3 | 2000 ppm Ca | 400 | 77 | 100 | 13 | 2/16" uniform | 31 | 21 | 3 | 4 |
| 76 | 19 | 5 | 5 | 2000 ppm Ca | 400 | 300 | 500 | 62 | 6/16" uniform | 19 | 20 | 26 | 42 |
| 76 | 19 | 5 | 5 | 2000 ppm Ca | — | 200 | 500 | 16 | 2/16" uniform | 41 | 18 | 4 | 22 |
| 76 | 19 | 5 | 5 | 2000 ppm Ca | 350** | 200 | 500 | 18 | 1/16" uniform | 32 | 12 | 5 | 6 |

*Polymer present as 70/30% wt. % blend of terpolymer/soda ash which results in a completely neutralized terpolymer (sodium salt form).
**Static heat aged

TABLE XII

| Polymer Monomer Component | | | | | Fluid Loss Test Conditions | | | | | Mud Rheology | | | |
|---|---|---|---|---|---|---|---|---|---|---|---|---|---|
| Acrylic Acid (wt %) | AMPS (wt %) | ITA | Dosage* lbs/bbl | Mud | 16 Hr Heat Aging Temp (°F.) | Temp (°F.) | Pr (psi) | Fluid Loss After 30 min (ml) | Filter Cake | PV (cps) | YP | 10 Sec Gel (lbs/100 ft²) | 10 Min Gel |
| 57 | 38 | 5 | 2 | 500 ppm Ca | — | 300 | 500 | 60 | — | 10 | 6 | 2 | 9 |
| 57 | 38 | 5 | 2 | 1000 ppm Ca | 200 | 300 | 500 | 94 | — | 14 | 7 | 1 | 4 |
| 57 | 38 | 5 | 2 | 34,000 ppm NaCl | — | 300 | 500 | 92 | — | 12 | 15 | 19 | 25 |
| 57 | 38 | 5 | 2 | 34,000 ppm NaCl | 200 | 300 | 500 | 104 | — | 9 | 17 | 19 | 25 |

*Polymer present as 70/30% wt. % blend of terpolymer/soda ash which results in a completely neutralized terpolymer (sodium salt form).

In the following tables, fluid loss data is presented for muds including weighted muds containing copolymers and terpolymers of AMPS in partially neutralized sodium and ammonium salt form. These polymers have been prepared in the same manner as the polymers of the preceding examples.

TABLE XIII

| Polymer* Monomer Component | | | | Mud** (14 lbs/gal density) | Fluid Loss Test Conditions | | | | | Mud Rheology | | | |
|---|---|---|---|---|---|---|---|---|---|---|---|---|---|
| Acrylic Acid (wt %) | AMPS (wt %) | ITA | Dosage* lbs/bbl | | 16 Hr Heat Aging Temp (°F.) | Temp (°F.) | Pr (psi) | Fluid Loss After 30 min (ml) | Filter Cake | PV (cps) | YP | 10 Sec Gel (lbs/100 ft²) | 10 Min Gel |
| 76 | 19 | 5 | 4 | 2000 ppm Ca++ | — | 300 | 500 | 46 | — | 40 | 9 | 2 | 8 |
| 76 | 19 | 5 | 4 | 2000 ppm Ca++ | 400 | 300 | 500 | 34 | — | 41 | 11 | 4 | 14 |

*Partially neutralized sodium salt form.
**Mud weighted with barites.

TABLE XIV

Seawater Mud II

| | Polymer* Monomer Component | | | | Fluid Loss Test Conditions | | | | | Mud Rheology | | | |
|---|---|---|---|---|---|---|---|---|---|---|---|---|---|
| | Acrylic Acid (wt %) | AMPS (wt %) | ITA | Dosage lbs/bbl | 16 Hr Heat Aging Temp (°F.) | Temp (°F.) | Pr (psi) | Fluid Loss After 30 min (ml) | Filter Cake | PV (cps) | YP | 10 Sec Gel (lbs/100 ft²) | 10 Min Gel |
| (Na—Salt) | 76 | 19 | 5 | 4 | — | 300 | 500 | 56 | — | 7 | 2 | 1 | 6 |
| (NH₄—Salt) | 76 | 19 | 5 | 4 | — | 300 | 500 | 38 | — | 9 | 4 | 1 | 12 |

*All polymers partially neutralized.

TABLE XV

Seawater Mud II* (14 lbs/gal density)

| | Polymer** Monomer Component | | | | Fluid Loss Test Conditions | | | | | Mud Rheology | | | |
|---|---|---|---|---|---|---|---|---|---|---|---|---|---|
| | Acrylic Acid (wt %) | AMPS (wt %) | ITA | Dosage lbs/bbl | 16 Hr Heat Aging Temp (°F.) | Temp (°F.) | Pr (psi) | Fluid Loss After 30 min (ml) | Filter Cake | PV (cps) | YP | 10 Sec Gel lbs/100 ft² | 10 Min Gel |
| (NH₄—Salt) | 76 | 19 | 5 | 5 | — | 300 | 500 | 26 | ⅛" soft | — | — | 17 | 29 |
| (Na—Salt) | 70 | 30 | — | 4 | — | 300 | 500 | 70 | — | 24 | 16 | 25 | 113 |
| | Blank | — | — | — | — | 300 | 500 | 146 (5½ min.) | | 20 | 130 | 46 | 45 |

*Mud weighted with barites.
**All polymers partially neutralized.

While the invention has been described with reference to certain specific embodiments thereof, it is understood that it is not to be so limited since alterations and changes may be made therein which are within the full intended scope of the appended claims.

What is claimed is:

1. An aqueous drilling fluid having present in an amount sufficient to reduce fluid loss of said drilling fluid, at least one polymer of (1) from about 5% to about 50% by weight of 2-acrylamido-2-methylpropane sulfonic acid and (2) from about 95% to about 50% by weight of a second component, there being from 100% to about 80% by weight of acrylic acid and from 0% by weight to about 20% by weight of itaconic acid in the second component, said polymer having a weight average molecular weight of between about 50,000 to about 1,000,000 being in its free acid or partially or completely neutralized form and being at least water dispersible.

2. The drilling fluid of claim 1 wherein the weight average molecular weight of said polymer is between about 100,000 to about 500,000.

3. The drilling fluid of claim 2 wherein said drilling fluid is a mud containing soluble calcium or chloride ions.

4. The drilling fluid composition of claim 3 wherein said polymer is present in an amount of from about 0.5 to about 10 pounds per 42 gallon barrel of drilling fluid.

5. The drilling fluid composition of claim 4 wherein said polymer is in the form of at least one free acid or partial or complete sodium, potassium, ammonium, organic amine or quaternary ammonium salt, said salt containing one or more of sodium, potassium, ammonium, organic amine or quaternary ammonium cations.

6. The drilling fluid composition of claim 5 wherein said polymer is a copolymer of about 10% by weight 2-acrylamido-2-methylpropane sulfonic acid and about 90% by weight acrylic acid in the form of its free acid or partially or completely neutralized sodium, potassium, ammonium, organic amine or quaternary ammonium salt.

7. The drilling fluid composition of claim 5 wherein said polymer is a copolymer of about 30% by weight 2-acrylamido-2-methylpropane sulfonic acid and about 70% by weight acrylic acid in the form of its free acid or partially or completely neutralized sodium, potassium, ammonium, organic amine or quaternary ammonium salt.

8. The drilling fluid composition of claim 5 wherein said polymer is a copolymer of about 40% by weight 2-acrylamido-2-methylpropane sulfonic acid and about 60% by weight acrylic acid in the form of its free acid or partially or completely neutralized sodium, potassium, ammonium, organic amine or quaternary ammonium salt.

9. The drilling fluid composition of claim 5 wherein said polymer is a copolymer of about 20% by weight 2-acrylamido-2-methylpropane sulfonic acid and about 80% by weight acrylic acid in the form of its free acid or partially or completely neutralized sodium, potassium, ammonium, organic amine or quaternary salt.

10. The drilling fluid composition of claim 5 wherein said polymer is a terpolymer of about 19% by weight 2-acrylamido-2-methylpropane sulfonic acid, about 76% by weight acrylic acid and about 5% by weight itaconic acid in the form of its free acid or partially or completely neutralized sodium, potassium, ammonium, organic amine or quaternary ammonium salt.

11. The drilling fluid composition of claim 5 wherein said polymer is a terpolymer of about 38% by weight 2-acrylamido-2-methylpropane sulfonic acid, about 57% by weight acrylic acid and about 5% by weight itaconic acid in the form of its free acid or partially or completely neutralized sodium, potassium, ammonium, organic amine or quaternary ammonium salt.

12. The drilling fluid composition of claim 5 wherein said polymer is a terpolymer of about 18% by weight 2-acrylamido-2-methylpropane sulfonic acid, about 72% by weight acrylic acid and about 10% by weight itaconic acid in the form of its free acid or partially or completely neutralized sodium, potassium, ammonium, organic amine or quaternary ammonium salt.

13. The drilling fluid composition of claim 5 wherein said polymer is a terpolymer of about 36% by weight 2-acrylamido-2-methylpropane sulfonic acid, about 54% by weight acrylic acid and about 10% by weight itaconic acid in the form of its free acid or partially or completely neutralized sodium, potassium, ammonium, organic amine or quaternary ammonium salt.

14. In a method of drilling a well into a subterranean formation in which an aqueous drilling fluid is circulated into the well, the step of circulating said drilling fluid, containing in an amount sufficient to reduce fluid loss of said drilling fluid, at least one polymer of (1) from about 5% to about 50% by weight of 2-acrylamido-2-methylpropane sulfonic acid and (2) from about 95% to about 50% by weight of a second component, there being from 100% to about 80% by weight of acrylic acid and from 0% by weight to about 20% by weight of itaconic acid in the second component, said polymer having a weight average molecular weight of between about 50,000 to about 1,000,000, being in its free acid or partially or completely neutralized form and being at least water dispersible.

15. The method of claim 14 wherein the weight average molecular weight of said copolymer is between about 100,000 to about 500,000.

16. The method of claim 15 wherein said drilling fluid is a mud containing soluble calcium or chloride ions.

17. The method of claim 16 wherein said polymer is present in said drilling fluid in an amount of from about 0.5 to about 10 pounds per 42 gallon barrel of drilling fluid.

18. The method of claim 17 wherein said polymer is in the form of at least one free acid or partial or complete sodium, potassium, ammonium, organic amine or quaternary ammonium salt, said salt containing one or more of sodium, potassium, ammonium, organic amine or quaternary ammonium cations.

19. The method of claim 18 wherein said polymer is a copolymer of from about 10% by weight 2-acrylamido-2-methylpropane sulfonic acid and about 90% by weight acrylic acid in the form of its free acid or partially or completely neutralized sodium, potassium, ammonium, organic amine or quaternary ammonium salt.

20. The method of claim 18 wherein said polymer is a copolymer of from about 30% by weight 2-acrylamido-2-methylpropane sulfonic acid and about 70% by weight acrylic acid in the form of its free acid or partially or completely neutralized sodium, potassium, ammonium, organic amine or quaternary ammonium salt.

21. The method of claim 18 wherein said polymer is a copolymer of from about 40% by weight 2-acrylamido-2-methylpropane sulfonic acid and about 60% by weight acrylic acid in the form of its free acid or partially or completely neutralized sodium, potassium, ammonium, organic amine or quaternary ammonium salt.

22. The method of claim 18 wherein said polymer is a copolymer of from about 20% by weight 2-acrylamido-2-methylpropane sulfonic acid and about 80% by weight acrylic acid in the form of its free acid or partially or completely neutralized sodium, potassium, ammonium, organic amine or quaternary ammonium salt.

23. The method of claim 18 wherein said polymer is a terpolymer of about 19% by weight 2-acrylamido-2-methylpropane sulfonic acid, about 76% by weight acrylic acid and about 5% by weight itaconic acid in the form of its free acid or partially or completely neutralized sodium, potassium, ammonium, organic amine or quaternary ammonium salt.

24. The method of claim 18 wherein said polymer is a terpolymer of about 38% by weight 2-acrylamido-2-methylpropane sulfonic acid, about 57% by weight acrylic acid and about 5% by weight itaconic acid in the form of its free acid or partially or completely neutralized sodium, potassium, ammonium, organic amine or quaternary ammonium salt.

25. The method of claim 18 wherein said polymer is a terpolymer of about 18% by weight 2-acrylamido-2-methylpropane sulfonic acid, about 72% by weight acrylic acid and about 10% by weight itaconic acid in the form of its free acid or partially or completely neutralized sodium, potassium, ammonium, organic amine or quaternary ammonium salt.

26. The method of claim 18 wherein said polymer is a terpolymer of about 36% by weight 2-acrylamido-2-methylpropane sulfonic acid, about 54% by weight acrylic acid and about 10% by weight itaconic acid in the form of its free acid or partially or completely neutralized sodium, potassium, ammonium, organic amine or quaternary ammonium salt.

* * * * *